April 4, 1950 M. LEHMANN 2,502,465
INDUSTRIAL TRUCK
Filed March 7, 1947 4 Sheets-Sheet 1

INVENTOR.
MAX LEHMANN.
BY Geo. B. Pitts
ATTORNEY

April 4, 1950 M. LEHMANN 2,502,465
INDUSTRIAL TRUCK
Filed March 7, 1947 4 Sheets-Sheet 2

INVENTOR.
MAX LEHMANN.
BY Geo. B. Pitts
ATTORNEY

April 4, 1950 M. LEHMANN 2,502,465
INDUSTRIAL TRUCK
Filed March 7, 1947 4 Sheets-Sheet 3

INVENTOR.
MAX LEHMANN.
BY
Geo. B Pitts
ATTORNEY.

April 4, 1950 M. LEHMANN 2,502,465
INDUSTRIAL TRUCK

Filed March 7, 1947 4 Sheets-Sheet 4

FIG. 15

INVENTOR.
MAX LEHMANN
BY Geo. B. Pitts
Attorney

Patented Apr. 4, 1950

2,502,465

UNITED STATES PATENT OFFICE 2,502,465

INDUSTRIAL TRUCK

Max Lehmann, East Cleveland, Ohio, assignor to The Baker-Raulang Company, Cleveland, Ohio, a corporation of Ohio Application March 7, 1947, Serial No. 733,032

17 Claims. (Cl. 187—9)

This invention relates to an industrial truck of the type having a raising and lowering load carrier. In trucks of this type, of which I have knowledge, the supports or guides for the elevating member, which supports the carrier, extend upwardly varying heights, determined by specific conditions in which each truck is to be employed, whereby loads can be stacked or positioned on and removed from different levels; as the carrier is fixedly related to the elevating member, its limit of upward movement approximates the height or length of the guides for the elevating member, so that operation of the carrier to the higher levels is dependent on the extension of the guides to the maximum height. This construction, as well as other factors required in the design of the truck to operate under these conditions, not only substantially increases the cost thereof, but by reason of the height of the supports and guides the truck cannot be driven through doors, arches and passage ways having the usual overhead ceiling limits; accordingly, one object of the invention is to provide an improved truck of this type wherein the distance of travel of the elevating member may be relatively short but provision is made for moving the carrier to a level above the limit of upward travel of the elevating member, whereby the construction of the truck and operating means for the carrier are simplified, cost thereof is reduced, translation of the truck from place to place is facilitated and the truck is operable throughout a wide range of loading and unloading conditions.

Another object of the invention is to provide an improved truck of this type having a substantially vertically movable elevating member and means for movably supporting a load carrier thereon adapted to pick up or discharge loads at substantially the floor level and discharge or pick up loads at levels above and below the upward limit of movement of the elevating member.

Another object of the invention is to provide an improved industrial truck of this type wherein the load carrier may be raised to varying heights beyond the upward limit of movement of the elevating member therefor.

Another object of the invention is to provide an improved truck of this type wherein the elevating member thereon is provided with a guide for the load carrier and means are provided for detachably supporting the load carrier at the lower end of the guide or in a horizontal plane thereabove.

Another object of the invention is to provide an improved truck of this type wherein the elevating member thereon is provided with a guide on which the load carrier is slidably mounted and means are provided for detachably supporting the carrier at the lower end of the guide or in an elevated plane remote therefrom.

Another object of the invention is to provide an improved truck of this type wherein the elevating member thereon is provided with a guide on which the load carrier is slidably mounted and arranged to be detachably supported at the lower end thereof and means, dependent on the vertical movements of the elevating member and guide, relative to the carrier, are provided for automatically detachably connecting the carrier to the guide in an elevated plane remote from the lower end thereof and automatically detaching the carrier therefrom.

A further object of the invention is to provide an improved truck of this type wherein the elevating member is provided with an upwardly extending guide on which the load carrier is slidably mounted and normally supported at the lower end thereof and means, dependent on the vertical movements of the guide relative to the carrier, are provided for automatically detachably connecting the carrier to the guide above its lower end or automatically releasing the carrier therefrom.

Other objects of the invention will be apparent to those skilled in the art to which my invention relates from the following description taken in connection with the accompanying drawings, wherein.

In the drawings, 1 indicates a frame supported on a front pair of wheels 2 and a rear pair of wheels 3. Either pair of wheels may be mounted for angular movement to effect steering of the truck by operation of a wheel 4, and either pair of wheels may be driven by suitable mechanism (not shown) having a power supply enclosed in a housing 5, which for illustrative purposes is mounted on the rear portion of the frame 1. The construction of the truck frame and the parts referred to form no part of the present invention and may therefore be of any desired construction and arrangement.

Figures 1, 6, 7, 12, 13, 14:
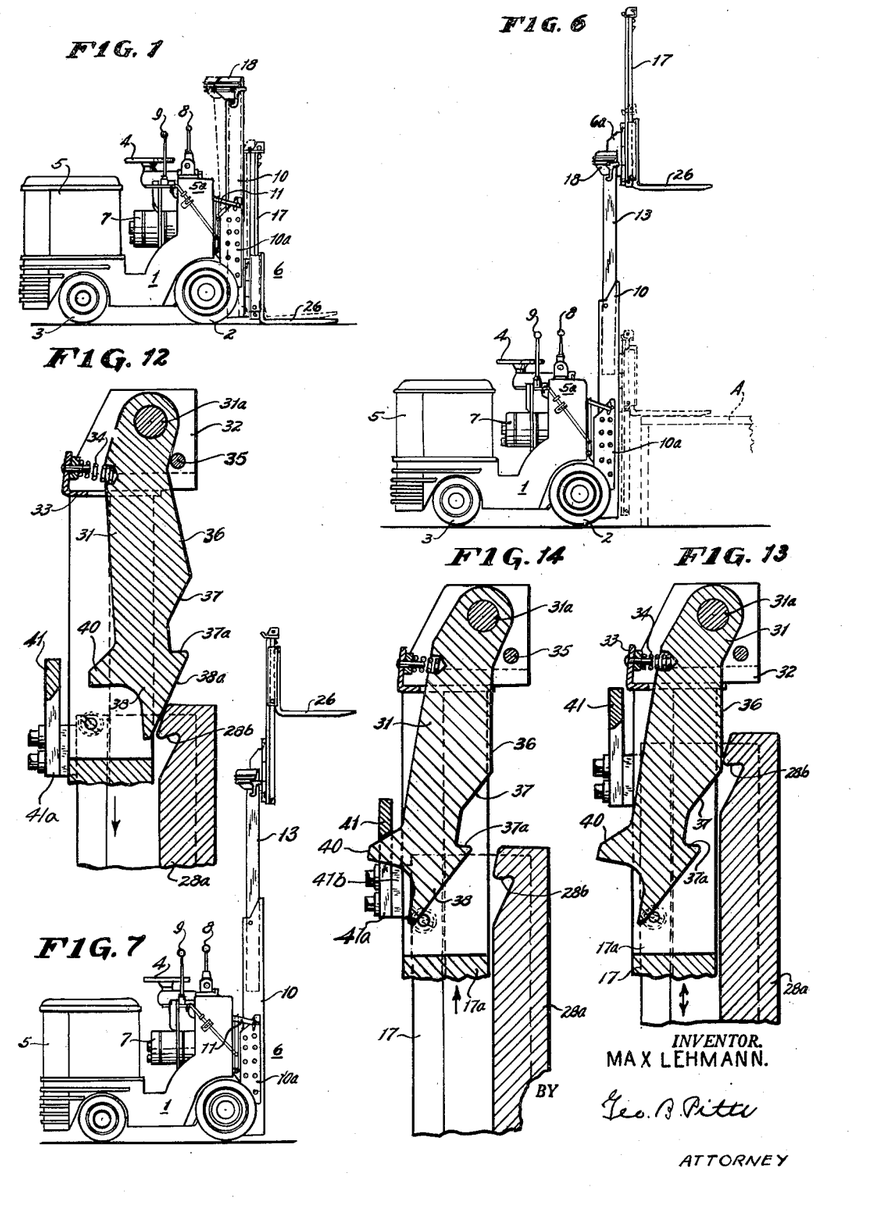
Fig. 1 is a side elevation of a truck embodying my invention.
Fig. 6 is a side elevation showing one way of changing the positioning of the carrier on the elevating member.
Fig. 7 is an elevation showing the carrier in its re-set position on the elevating member and raised to the higher level.
Figs. 12, 13 and 14 are sections similar to Fig. 10, but showing the cycle of movement of the connecting and releasing member for connecting the carrier in different positions to the elevating member.

6 indicates as an entirety an elevating mechanism preferably suitably mounted on the frame 1 for tilting inwardly, as shown in dotted lines in Fig. 1. The means for operating the elevating mechanism 6 may be of the electric or hydraulic type. Where this latter referred to type is employed, a motor 7 is used for operating a pump, and the control of the motor and liquid from and to the pump is effected by suitable levers (only two of the levers designated 8 and 9 being shown); but the disclosure and all reference herein to the hydraulic means for raising or lowering the elevating member and swinging the guides therefore are merely descriptive and not intended to be limiting of the invention.

The elevating mechanism 6 comprises suitable guide means (later referred to) and an elevating member (indicated as an entirety at 6a) supported on and movable relative to the guide means and adapted to support a carrier thereon at different elevated positions, whereby such mechanism may have a wide range of utility.

Referring to the elevating mechanism 6, 10 indicates a pair of spaced guide elements provided with reinforcing plates 10a, having inwardly extending portions which are suitably fulcrumed on the frame 1. The outer end of a rod 11 is pivotally connected to each plate 10a and extends inwardly therefrom, the inner end of the rod carrying a piston reciprocatable in a cylinder (not shown), to which liquid under pressure is supplied in a well known manner, whereby the elevating mechanism 6 may be tilted inwardly and moved outwardly to its normal or vertical position. The cylinders for the pistons on the rods 11 and other parts for the supply and flow of the fluid are mounted in a housing 5a. The guide elements 10 are connected at their lower ends by a base 12 and intermediate their upper and lower ends by a plate 12a. The guide elements 10 are channel shaped in cross section and, if desired, the elevating member 6a may be slidably mounted directly thereon, but to provide for a wider range of loading, unloading and stacking operations I mount a pair of guide members 13 for slidable or telescopic movement in the guide elements 10 and slidably support the elevating member 6a in the guides 13. In this arrangement the guide members 13 may be moved endwise of the guide elements 10 and the elevating member 6a moved longitudinally of the guide members 13 to the upper ends thereof and thus serve to operate the elevating member 6a to a level higher than would be otherwise permitted by the guide elements 10.

The elevating member 6a comprises the following: 14, 14a, indicate upper and lower plates to which are connected inwardly extending supports 15. Each support 15 is provided with laterally extending upper and lower stud shafts carrying rollers 15a which roll on and are guided by the walls of the guide members 13. 16, 16a, indicate upper and lower bars removably engaging the upper end of the upper plate 14 and lower edge of the lower plate 14a, respectively, and provided with upwardly extending spaced auxiliary guide members 17, 17, later referred to.

Figure 4:
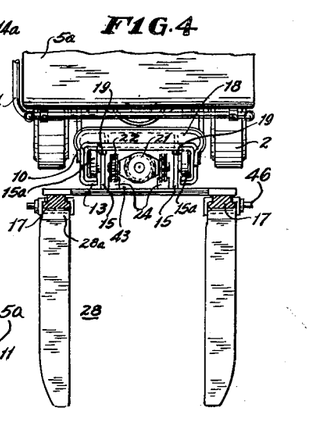
Fig. 4 is a section on the line 4—4 of Fig. 3.
Figure 5:
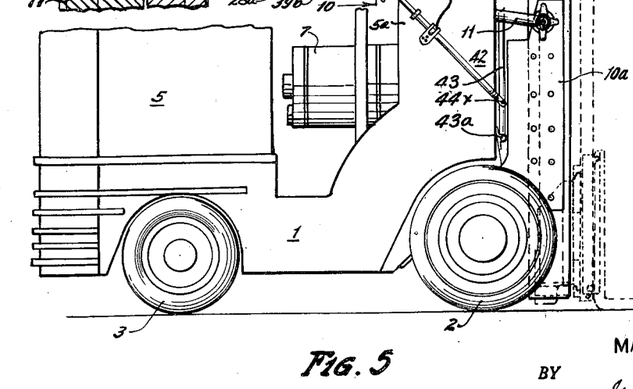
Fig. 5 is a fragmentary side elevation (enlarged) showing the carrier in elevated position; also showing in dotted lines the carrier in its lowest and highest elevated position.

The upper ends of the guide members 13 are connected by a cross member 18 the lower edge of which is disposed in the path of movement of shoulders 19 (see Fig. 4) on the inner end walls of the roller supports 15 so that in the upward movement of the latter the shoulders 19 engage the cross member 18 and operate therethrough to move the guide members 13 upwardly, as shown in Figs. 2, 3, 5, 6 and 7.

The mechanism for raising the elevating member 6a may be of any desired type, but is shown as consisting of a cylinder 20 mounted on the base 12 midway the guide elements 10 and extending upwardly therefrom and enclosing a reciprocatable piston provided with a rod 20a. The upper end of the rod 20a is provided with a head 21 supporting on its opposite ends sprockets 22, which are engaged by chains 22a. The inner ends of the chains 22a are connected to the upper ends of rods 23, the lower ends of which are suitably anchored to the base 12. The outer ends of the chains 22a are secured to angles 24 mounted on the cross plate 14a (see Fig. 2). By supplying fluid under pressure through the supply pipe 25 (see Fig. 2) to the lower end of the cylinder 20, the piston therein will be operated upwardly and through the rod 20a operate the elevating member 6a upwardly and the latter in turn through the cross member 18, will slide the guide members 13 upwardly; by directing the flow of the fluid from the cylinder to a sump, these parts will gravitate downwardly.

Suitable limiting devices (not shown) may be provided to stop the elevating member 6a or guide members 13 in their movement upwardly and downwardly at predetermined positions. Means 13a are provided for locking the guides 13 to the guide elements 10 during movement of the elevating member 6a upwardly and releasing the guides 13 from the members 10 in advance of the engagement of the shoulders 19 with the cross member 18 in the event the upward movement of the elevating member 6a is continued; and separate means (not shown) are provided to interlock the elevating member 6a to the guides 13 during movement of the latter from an extended position downward until the guides approach or reach the limit of their movement. The locking and interlocking means above referred to form no part of the present invention, but are advantageous in controlling the movements of the elevating member and guides.

Figure 8:
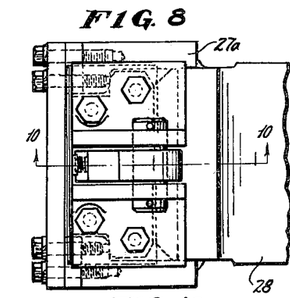
Fig. 8 is a fragmentary plan view of parts in Fig. 9.
Figure 11:
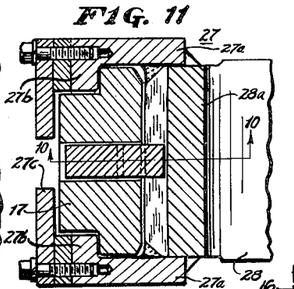
Fig. 11 is a section on the line 11—11 of Fig. 10.

26 indicates as an entirety a carrier slidably mounted on the auxiliary guide members 17 and adapted to be removably supported on the lower ends thereof or in a plane thereabove, preferably adjacent their upper ends. The carrier consists of a pair of spaced shoes 27 (see Figs. 2, 5, 8 and 11) slidably fitting the auxiliary guide members 17 and a suitable support 28 fixed to and extending outwardly from the shoes 27. By preference the support 28 consists of a pair of arms having vertical legs 28a, each of which is welded to rearwardly extending side walls 27a and cooperate therewith to form a shoe 27 (see Figs. 8 and 11). The side walls 27a of each shoe are provided along their rear edges with off-sets 27b, which fit ways provided in and extending longitudinally of the adjacent auxiliary guide member 17, and cooperate with the adjacent leg 28a to slidably support the shoe 27 thereon.

The upper end portion of each leg 28a, on its inner side, is formed with a transverse recess shaped to provide a shoulder 28b, the purpose of which will later be apparent.

Figure 9:
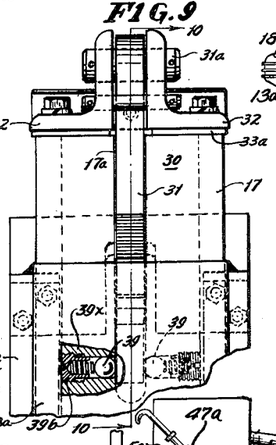
Fig. 9 is a fragmentary elevational view of parts shown in Fig. 8, looking toward the left thereof.

The outer sides of the auxiliary guide members 17, adjacent their lower ends, are provided with outwardly extending elements 29 with which the shoes 27 removably engage to support the carrier 26 on and at the lower ends of the members 17 for movement therewith. When the carrier 26 is mounted at the lower ends of the auxiliary guide members 17, it may be positioned at substantially floor level, as shown in Fig. 1 (also, shown in dotted lines in Fig. 5), for picking up or discharging a load at this level, and raised to the position shown in Figs. 2, 3, 5 and 6. However, to permit a load to be picked up or discharged at a higher level, means, indicated as an entirety at 30, are provided for (a) automatically detachably positioning the carrier 26 on the auxiliary guide members 17 in a plane above that when the carrier 26 is supported on the elements 29 (preferably adjacent the upper ends of these members), whereby the carrier 26 may be elevated to a level above the upper ends of the guide members 13 when the latter are operated upwardly, for example, to the limit of their upward movement, as shown in Figs. 6 and 7, (also shown in dotted lines in Fig. 5), and (b) automatically releasing or detaching the carrier 26 from the members 17, the operation of the detachable means 30 being dependent upon the movement of the elevating member and auxiliary guides 17 to predetermined positions relative to the carrier 26, as later set forth. The detachable means 30 may be supported between the auxiliary guide members 17 and engage the carrier 26 intermediate the shoes 27, but by preference I provide such means on each of the members 17, so that the connections with the carrier 26 will be in line with the supporting arms 28, respectively. As the detachable means 30 on the auxiliary guide members 17 are similar in construction and corresponding parts thereof are disposed in alinement and operate simultaneously, only one thereof will be referred to as follows; 31 indicates a lock and release element pivotally supported at its upper end on a transversely disposed pin 31a extending between and supported at its opposite ends by spaced standards 32, which are rigidly secured to the upper end of the adjacent auxiliary guide member 17. The lock and release element 31 extends downwardly for swinging movement inwardly and outwardly in the plane of the adjacent leg 28a, the adjacent auxiliary guide member 17 being formed with a slot 17a, extending inwardly from its upper end to accommodate the element 31. 33 indicates a bracket having inwardly extending spaced portions 33a which are secured to the upper end of the adjacent auxiliary guide member 17 by the standards 32 at opposite sides of the element 31. The outer end of the bracket 33 is bent upwardly and provides a suitable mounting for the outer end of an expansion spring 34, the inner end of which engages the element 31 and normally tends to swing it outwardly against a stop 35 extending between and supported by the standards 32. The front or outer edge of the lock and release element 31 is formed with a wall 36 which rides on and is guided by the terminating end of the shoulder 28b, as later set forth. Below the wall 36 the element 31 is relieved or recessed to provide a cam 37 and a hook 37a therebelow adapted to engage the shoulder 28b and below the hook 37a the element 31 terminates in a tail member 38 adapted to be engaged by a spring operated device 39 mounted in an opening 39x formed in one side wall of the slot 17a and projecting inwardly thereinto. The device 39 being yieldable, permits the tail member 38 to be moved to the inner side thereof (see Fig. 14), whereby the element 31 is held against outwardly swinging movement. By preference, I provide a device 39 in each side wall of the slot 17a, as shown in Fig. 9, each device 39 consisting of a ball urged inwardly into the slot by a spring 39a. The spring 39a is seated in a pocket 39b having screw threaded connection with the walls of the adjacent opening, the inner end of the latter being restricted to limit the inward movement of the adjacent ball 39.

The front or outer end of the tail member 38 is inclined downwardly and inwardly to form a separate cam 38a which is adapted to engage and ride the outer wall of the shoulder 28b, whereby, in the downward movement of the auxiliary guide element 17, relative to the leg 28a, to position the hook 37a below the shoulder 28b, the element 31 swings inwardly and then outwardly under the influence of the spring 34 to relate the hook 37a to the shoulder 28b, as later set forth.

The rear or inner edge of the element 31, adjacent its lower end, is provided with an outwardly extending re-setting member 40 arranged to engage a transverse wall 41 mounted on the rear side of the adjacent shoe 27 in a plane above its upper end, so as to re-set the element 31 after the shoulder 37a on the latter is moved upwardly beyond the shoulder 28b. The wall 41 is provided, at its opposite ends, with depending legs 41a which are suitably secured to the side walls 27a of the adjacent shoe 27, spacers 41b being interposed between the side walls 27a and legs 41a to support the wall 41 rearwardly of the shoe to accommodate the movement of the element 31.

The automatic connection of the carrier 26 to the upper ends of the auxiliary guide members 17 is dependent on engaging the carrier with an arresting means and moving the elevating member 6a and auxiliary guide members 17 downwardly relative thereto to a predetermined position (termed the connectable position) and the automatic release of the carrier 26 from the upper ends of the members 17, whereby the carrier may be supported on the elements 29, is dependent on engaging the carrier with an arresting means and moving the elevating member 6a and members 17 downwardly to a predetermined position (termed the releasable position) below the first mentioned predetermined or connectable position.

Figure 10:
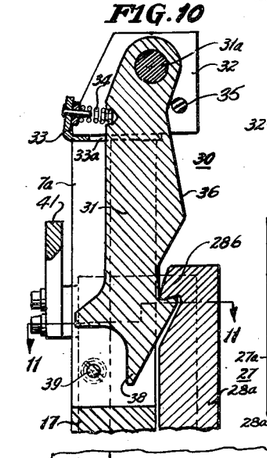
Fig. 10 is a section on the line 10—10 of Figs. 8, 9 and 11.

*Operation.*—To transfer the carrier 26 from the supporting elements 29 and connect it to the upper ends of the members 17, the elevating member 6a and carrier 26 are first raised to a position above a suitable arresting means and then lowered to engage the carrier 26 therewith and continue the downward movement of the elevating member and members 17. Where a table or platform, as shown in dotted lines at A (Fig. 6) is employed, the truck, following the raising of the elevating members 6a and carrier 26, is driven forward to position the carrier 26 over the table or platform A; but where the arresting means, later set forth, are provided on the truck, driving of the latter is not required. With the carrier 26 in arrested position, the auxiliary guide members 17 are moved downwardly to the connectable position to position the hooks 37a below the shoulders 28b. In this movement, the separate cams 38a ride the walls of the shoulders 28b and swing the elements 31 inwardly and following the movement of the hooks 37a past the shoulders 28b the springs 34 swing the elements 31 outwardly with the hooks 37a in position to engage the shoulders 28b. By raising the elevating member 6a and members 17, the hooks 37a and shoulders 28b will interlock (see Fig. 10) to connect the carrier 26 to the upper ends of the members 17, so that by operation of the raising and lowering mechanism 6, as already set forth, the carrier 26 may be raised to the position shown in Fig. 7.

In automatically releasing the carrier 26 from the upper ends of the auxiliary guide members 17, the elevating member 6a and carrier 26 are raised to a position above the arresting means and then lowered to engage the carrier with the latter. In the continued downward movement of the elevating member and guide members 17 to the releasable position shown in Fig. 13, cams 37 engage with and ride the walls of the shoulders 28b, the effect of which is to swing the elements 31 inwardly, thereby disengaging the hooks 37a from the shoulders 28b and moving the tails 38 past the yieldable devices 39, which lock the members 31 against outward movement in opposition to the tension of the springs 34 (see Fig. 13). By moving the elevating member 6a and guide members 17 upwardly, the re-setting members 40 will engage with and ride the transverse walls 41 (see Fig. 14), which will swing the elements 31 outwardly into normal position, that is, under the influence of the springs 34 and against the stops 35; continued upward movement of the elevating member 6a and guide members 17 will enable the elements 29 to engage the shoes 27 and pick up the carrier 26, thereby connecting the latter to the lower ends of the members 17. As shown in Figs. 13 and 14, the yieldable locking devices 39 hold the element 31 in released position during the upward movement of the members 17 until the re-setting members 40 ride the walls 41. It will be noted that the re-setting members 40 are arranged in a plane below the hooks 37a and the transverse walls 41 are disposed above the upper ends of the carrier legs 28a, so that when the elements 31 are swung outwardly by the walls 41, the hooks 37a are above the legs 28a (see Fig. 12) and incapable of engaging the shoulders 28b.

The arresting means, indicated as an entirety at 42, comprises a pair of swingable members 43 and an operating handle 44 therefor.

Figure 15:
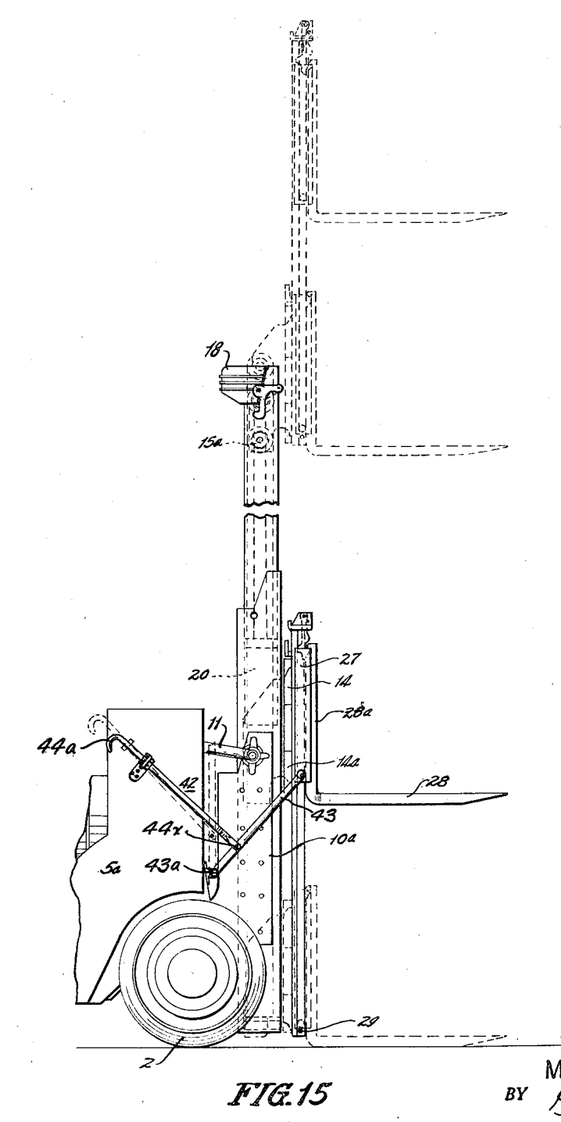
Fig. 15 is a fragmentary side elevation showing a modification.

The members 43 are fixed at their lower ends to a transverse rock shaft 43a, which is mounted in spaced standards 45 suitably fixed to the front wall of the housing 5a, and extend upwardly therefrom, and normally held against the housing 5a by the handle 44, but are swingable outwardly, due to operation of the shaft 43a, to the position shown in Fig. 15. 46 indicates pins projecting laterally from the outer sides of the shoes 27 and disposed in line with the outer or free ends of the arresting members 43, when the latter are in operated position, whereby the carrier 26 is arrested in the downward movement of the elevating member 6a; accordingly, if this movement is continued to the connectable position the carrier will be automatically connected to the upper ends of the auxiliary guide members 17 in the manner already set forth, or if the carrier 26 has been connected to the upper ends of the members 17 and is to be resupported on the devices 29, movement of the elevating member downwardly and this movement is continued to the releasable position, the carrier 26 will be automatically released from the members 17, as already set forth. The shaft 43a is rocked to swing the members 43 outwardly and back to normal position by operation of the handle 44. The inner end of the handle 44 is pivotally connected to a stud shaft 44x fixed to and projecting laterally from the adjacent member 43 at a point remote from the shaft 43a. The handle 44 extends upwardly from the shaft 44x and terminates at its upper end in a gripping element 44a within easy reach of the operative. The outer end portion of the handle 44, inwardly of the element 44a, is provided with a collar 44b adapted to engage the rear end wall of a lock member 47, which is fixed to the adjacent side wall of the housing 5a, to hold the members 43 in normal or in an operative position. The lock member 47 is formed with an inwardly extending recess or socket 47a into which the collar 40b may be seated to rigidly support the arresting members 43 in operated position.

In operation, to move the members 43 to operating position, the handle 44 is first swung upwardly to disengage the collar 44b from the end wall of the lock member 47, then moved endwise, which movement rocks the shaft 43a clockwise, as viewed in Fig. 15, and then swung downwardly to seat the collar 44b in the recess 47a, the side walls of which operate through the collar 44b, handle 44 and rock shaft 43a to hold the members 43 in operated position. After the elevating member 6a is raised, following the connection of the carrier 26 to the upper ends of the members 17 or its disconnection therefrom, whereby the pins 46 are disengaged from the arresting members 43, the latter may be restored to normal position by operating the handle 44 reversely to that above set forth.

Figures 2, 3:
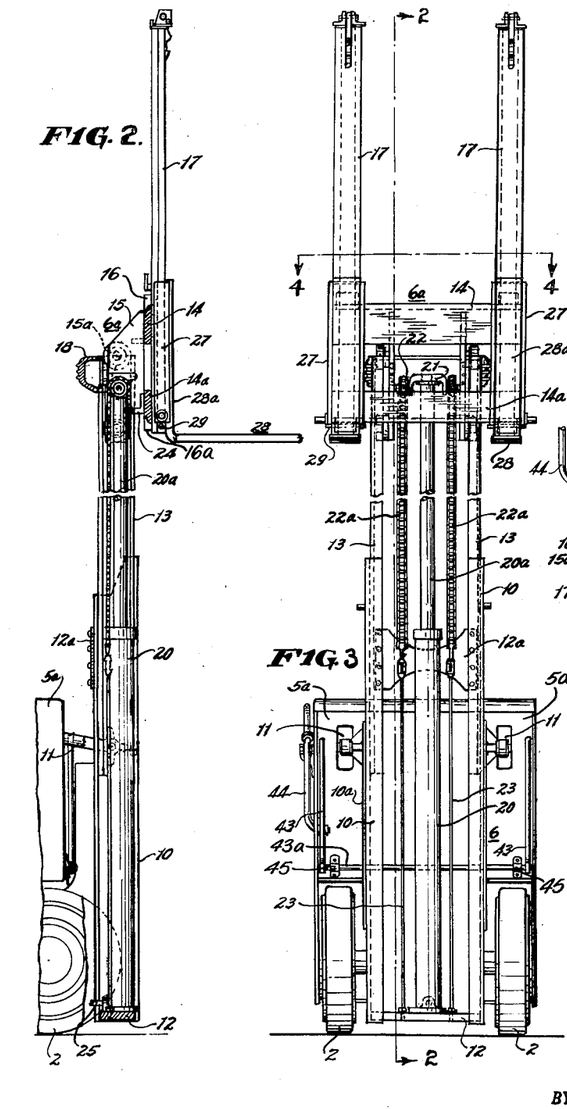
Fig. 2 is a section on the line 2—2 of Fig. 3.
Fig. 3 is a front view of parts shown in Fig. 2.

Fig. 1 shows the position of the carrier 26 when picking up or discharging a load at substantially floor level. Figs. 2, 3 and 6 show the position of the carrier when supported on the devices 29 and raised to the highest level provided for by the guide elements 10 and guide members 13. Fig. 7 shows the position of the carrier when connected to the upper ends of the auxiliary guide members 17 with the elevating member and guide members raised to the limit of their movement.

It will be noted that when the carrier 26 is mounted in either position on the auxiliary guide member 17, it may be employed to pick up and discharge loads at different levels; except that the carrier must be mounted on the devices 29 when the pick-up or discharge operation is at floor level.

From the foregoing description it will be observed that with the carrier connected to the lower ends of the auxiliary members 17, loads may be picked up at floor level and raised to and discharged at higher levels or picked up at higher levels and discharged at the floor level. However, where the load is to be discharged at or picked up by the carrier 26 at a still higher level, the carrier 26 is connected to the upper end of the members 17.

Due to the fact that the detachable and release elements operate automatically merely by raising and lowering the elevating member 6a, the operative can readily and in a rapid manner support the carrier in either position on the members 17. It will also be observed (a) that the construction lends itself for use in a wide range of operating conditions without making it necessary to provide long guide elements and thus prevent driving the truck through doorways, and tunnels having the usual heights of ceilings and (b) that for any given length of the guide elements the carrier may be raised to levels exceeding that capable in trucks of this type of which I have knowledge.

To those skilled in the art to which my invention relates many changes in construction and widely differing embodiments and applications of the invention will suggest themselves without departing from the spirit and scope of the invention. My disclosures and the description herein are purely illustrative and are not intended to be in any sense limiting.

What I claim is:

1. In a truck, the combination with a frame, substantially vertically disposed guides thereon, an elevating member slidably mounted on said guides and means for moving said member substantially from end to end of said guides, of a vertically disposed longitudinally extending support on said elevating member, a load carrier slidably mounted on said support, and upper and lower means on said support for removably supporting said load carrier on said support at different levels thereof for movement therewith, said upper means including a device on said support arranged to automatically engage said carrier when moved downwardly relative to said carrier to a predetermined position and to automatically disengage said carrier when moved downwardly relative to said carrier to a position below said predetermined position.

2. In a truck, the combination with a frame, substantially vertically disposed guides thereon, an elevating member slidably mounted on said guides and means for moving said member substantially from end to end of said guides, of a supporting member on said elevating member and extending upwardly therefrom, a supporting device on one of said members adjacent the lower end of said supporting member, a load carrier removably supported on said device for movement with said members, devices on said supporting member and said carrier, respectively, aranged to automatically engage upon movement of said members downwardly to a predetermined position relative to said carrier, for connecting the latter to said supporting member above said supporting device, whereby said carrier may be raised to a level above the upper end of said guides, and cams on the devices on said supporting member and said carrier arranged to automatically disengage said devices upon movement of said members downwardly to a position below said predetermined position.

3. In a truck, the combination with a frame, substantially vertical guides thereon, an elevating member slidably mounted on said guides and means for raising and lowering said member substantially from end to end of said guides, of means for raising loads to levels above and below the upper end of said guides and discharging or picking up loads from the different levels, said means comprising a guide mounted on and extending upwardly from said elevating member, a load carrier slidably mounted on said last mentioned guide, means for removably supporting said carrier on the lower portion of said last mentioned guide for movement therewith, and means for connecting said carrier to said guide above said supporting means for movement with said guide and disconnecting said carrier from said guide, said means being automatically operable upon movement of said guide downwardly to one position relative to said carrier to connect the carrier to said guide and automatically operable upon movement of said guide downwardly to a lower position to disconnect said carrier from said guide.

4. A truck as claimed in claim 2 wherein is provided movable means on the truck arranged to be positioned in the path of movement of the load carrier to arrest it in the downward movement of said members.

5. In a truck, the combination with a frame, substantially vertically disposed guides thereon, an elevating member slidably mounted on said guides and means for moving said member substantially from end to end of said guides, of a supporting member on said elevating member and extending upwardly therefrom, a supporting device on one of said members, a load carrier removably engaging said supporting device for movement with said members from end to end of said guides, automatically operated means operable during downward movement of said members relative to said carrier to a predetermined position, for connecting the latter to said supporting member above said supporting device, whereby said carrier may be raised to a level above the upper end of said guides, and engageable walls on said carrier and one element of said automatically operated means operable during downward movement of said members to a lower predetermined position for releasing said carrier from said supporting member.

6. In a truck, the combination with a frame, substantially vertically disposed guides thereon, an elevating member slidably mounted on said guides and means for moving said member substantially from end to end of said guides, of a supporting member on said elevating member and extending upwardly therefrom, a supporting device on one of said members adjacent the lower end of said supporting member, a load carrier removably supported on said device for movement with said members, and provided with a shoulder, and automatically operated means on said supporting member, dependent on the movement of said members relative to said carrier to one predetermined position, for connecting the latter to said supporting member above said supporting device, whereby said carrier may be raised to a level above the upper end of said guides, said automatically operated means including a stop and a spring biased element normally engaging said stop and having a hook arranged to detachably interlock with said shoulder, upon downward movement of said members to a predetermined position, co-acting walls on said carrier and said element for moving the latter to release its hook from said shoulder, upon downward movement of said members beyond said predetermined position, and means on said supporting member for locking said element in its released position.

7. A truck as claimed in claim 6 wherein said carrier and said spring biased element are provided with co-acting walls arranged to detach the latter from said locking means during the upward movement of said elevating member and permit said element to re-engage said stop.

8. In a truck, the combination with a frame, substantially vertically disposed guides thereon, an elevating member slidably mounted on said guides and means for moving said member substantially from end to end of said guides, of an auxiliary guide member on said elevating member and extending upwardly therefrom, a stop on said auxiliary guide member adjacent its upper end, a supporting device on one of said members adjacent the lower end of said auxiliary guide member, a load carrier having a shoe slidably mounted on said auxiliary guide member and arranged to removably engage said supporting device, said shoe being provided with a shoulder, a spring biased element pivotally mounted at its upper end on said auxiliary guide member and normally set against said stop, said element being provided with a hook arranged to engage said shoulder upon downward movement of said auxiliary guide member relative to said carrier to a predetermined position, whereby said carrier is connected to said auxiliary guide member, means for disengaging said hook from said shoulder upon downward movement of said auxiliary guide member relative to said carrier to a position beyond said predetermined position, and means for re-setting said spring biased element against said stop upon movement of said auxiliary guide member upwardly.

9. In a truck, the combination with a frame, substantially vertically disposed guides thereon, an elevating member slidably mounted on said guides and means for moving said member substantially from end to end of said guides, of an auxiliary guide on said member and extending upwardly therefrom, a stop on said auxiliary guide adjacent its upper end, a supporting device on the lower end of said auxiliary guide, a load carrier having a shoe slidably mounted on said auxiliary guide and arranged to removably engage said supporting device, said shoe being provided on one side with a shoulder and on another side with a wall above said shoulder, a spring biased element pivotally mounted at its upper end on said auxiliary guide above said supporting device and normally engaging said stop, said element being provided with a hook arranged to engage said shoulder upon downward movement of said auxiliary guide relative to said carrier to a predetermined position, whereby said carrier is connected to said auxiliary guide, and a cam arranged to engage said shoe upon downward movement of said auxiliary guide relative to said carrier to a position beyond said predetermined position to release said hook from said shoulder, means on said auxiliary guide for holding said spring biased element in released position, and a device on said spring biased element arranged to engage said wall in the upward movement of said auxiliary guide to release it from said holding means and permit said element to re-engage said stop.

10. A truck, as claimed in claim 8 wherein means are arranged to be positioned in the path of movement of said carrier for arresting it during downward movement thereof.

11. A truck as claimed in claim 10 wherein said arresting means consist of a rock shaft mounted on said frame, a pair of members fixed to said shaft and normally extending upwardly therefrom and swingable outwardly into the path of movement of said carrier, a handle for rocking said shaft and means on said frame engaging said handle to prevent movement of said shaft in either direction.

12. In a truck, the combination with a frame, substantially vertically disposed guide means thereon, an elevating member slidably mounted on said guide means and means for moving said member longitudinally of said guide means, of an auxiliary guide member on said elevating member and extending upwardly therefrom, a load carrier having a shoe slidably mounted on said auxiliary guide member and provided with a shoulder, a supporting device on one of said members adjacent the lower end of said auxiliary guide member for removably supporting said carrier, a stop on said auxiliary guide member, a spring biased element pivotally mounted at its upper end on said auxiliary guide member and normally set against said stop, said element being provided with a hook arranged to engage said shoulder upon downward movement of said auxiliary guide member to a predetermined position relative to said carrier, co-acting means on said element and said carrier arranged to operate said element about its pivot to disengage said hook from said shoulder upon downward movement of said auxiliary guide member beyond said predetermined position, means for holding said element in operated position, and co-acting means on said element and carrier, operable in the upward movement of said auxiliary guide member after said hook passes said shoulder, for releasing said element from said holding means and re-setting it against said stop.

13. In a truck, the combination with a frame, substantially vertically disposed guides thereon, an elevating member slidably mounted on said guides and means for moving said member substantially from end to end of said guides, of an auxiliary guide member on said elevating member and extending upwardly therefrom, a stop on said auxiliary guide member adjacent its upper end, a supporting device on one of said members adjacent the lower end of said auxiliary guide member, a load carrier having a shoe slidably mounted on said auxiliary guide member and arranged to removably engage said supporting device, said shoe being provided with a shoulder, a spring biased element pivotally mounted at its upper end on said auxiliary guide member and normally set against said stop, said element being provided with a hook arranged to engage said shoulder upon downward movement of said auxiliary guide member relative to said carrier to a predetermined position, whereby said carrier is connected to said auxiliary guide member, means for disengaging said hook from said shoulder upon downward movement of said auxiliary guide member relative to said carrier to a position beyond said predetermined position, and means carried by said element and shoe for re-setting said spring biased element against said stop upon movement of said auxiliary guide member upwardly.

14. In a truck, the combination with a frame, substantially vertically disposed guides thereon, an elevating member slidably mounted on said guides and means for moving said member substantially from end to end of said guides, of an auxiliary guide on said member and extending upwardly therefrom, a stop on said auxiliary guide adjacent its upper end, a supporting device on the lower end of said auxiliary guide, a load carrier having a shoe slidably mounted on said auxiliary guide and arranged to removably engage said supporting device, said shoe being provided on one side with a shoulder, a spring biased element pivotally mounted at its upper end on said auxiliary guide and normally engaging said stop, said element being provided with a hook arranged to engage said shoulder upon downward movement of said auxiliary guide relative to said carrier to a predetermined position, whereby said carrier is connected to said auxiliary guide, and automatically operated means, dependent on movement of said auxiliary member relative to said carrier downwardly beyond said predetermined position and upwardly therebeyond, for operating said element to release said hook from said shoulder and re-engage it with said stop.

15. In a truck, the combination with a frame, substantially vertically disposed guides thereon, an elevating member slidably mounted on said guides and mechanism for moving said member upwardly and downwardly substantially from end to end of said guides, of a supporting member on said elevating member and extending upwardly therefrom, a supporting device on one of said members, a load carrier slidably mounted on said supporting member adapted to removably engage said device and provided with a shoulder, means adapted to be positioned in the path of movement of said carrier for arresting it during downward movement of said supporting member, an element pivoted on said supporting member above said supporting device and normally depending downwardly and provided with hook, and control elements for guiding said pivoted element to engage said hook with said shoulder upon movement of said supporting member downwardly relative to said carrier to a predetermined position, swing said pivoted element in one direction to release said hook from said shoulder upon movement of said supporting member relative to said carrier to a position below said predetermined position and swing said pivoted element in the opposite direction to normal position upon movement of said supporting member upwardly relative to said carrier.

16. In a truck, the combination with a frame, substantially vertically disposed guides thereupon, an elevating member slidably mounted on said guides and means for moving said member along said guides, of a guide member on said elevating member and extending upwardly therefrom, a supporting device on one of said members adjacent the lower end of said guide member, a load carrier consisting of a load support and an upright member slidably engaging said guide member and arranged to be removably supported on said device, and connectable and disconnectable elements carried by the upper end of said guide member and the upper end of said upright member, the element on said guide member being swingable and operable to connect said carrier to said guide member upon movement of said guide member downwardly relative to said upright member to a predetermined position and operable to disconnect said elements upon movement of said guide member downwardly relative to said upright member to a lower position.

17. A truck as claimed in claim 16 wherein said guide member is provided wth a spring operated device arranged to hold said swingable element disengaged from the element on said upright member during upward movement of said guide member and a device on said upright member in a plane above the element on the latter for releasing said swingable element from said spring operated device in the continued upward movement of said guide member.

MAX LEHMANN.

REFERENCES CITED

The following references are of record in the file of this patent:

UNITED STATES PATENTS

| Number | Name | Date |
|---|---|---|
| 2,339,120 | Ulinski | Jan. 11, 1944 |